United States Statutory Invention Registration [19]

[11] Reg. Number: H699

Thomas, Sr. [43] Published: Nov. 7, 1989

[54] SUBMUNITION FUSE WITH PYROTECHNIC IGNITION

[75] Inventor: Terry E. Thomas, Sr., Forest Hill, Md.

[73] Assignee: The United States of America as represented by the Secretary of the Army, Washington, D.C.

[21] Appl. No.: 379,040

[22] Filed: Jul. 10, 1989

[51] Int. Cl.[4] ..... F42B 13/46

[52] U.S. Cl. ..... 102/370; 102/244; 102/489

*Primary Examiner*—Charles T. Jordan

*Attorney, Agent, or Firm*—Anthony T. Lane; Edward Goldberg; Edward F. Costigan

[57] ABSTRACT

A plurality of submunitions packed in a projectile deliver an incapacitating gas payload at far range from the projectile launch site only after the projectile has been properly launched and armed. A pyrotechnic fuse detonates each submunition by the detonation of an onboard expelling charge.

9 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SUBMUNITION FUSE WITH PYROTECHNIC IGNITION

BACKGROUND OF THE INVENTION

1. Field of the Invention

This invention generally relates to a pyrotechnic ignition fuze for a submunition loaded with a solid pyrotechnic chemical main charge which, when burned, produces an incapacitating gas and, more particularly, to the reliable delivery of the gas to, and the saturation of, a restricted area at far range from the launch point of a projectile in which the submunition is contained.

2. Description of Related Art

In many applications, e.g. tear gas for riot control or chemical warfare, it is desirable to deny access of a certain area to unauthorized persons or enemy forces. For this purpose, an incapacitating gas is used to saturate the restricted area. It has been proposed to load a solid pyrotechnic chemical main charge in each of a plurality of submunitions, all of which are loaded in a launch projectile, for example, a 155 mm projectile fired from a gun or howitzer. The projectile is typically launched at a far range from the restricted area, primarily to protect launch personnel from the incapacitating effects of the gas which might occur if there is a firing malfunction or if prevailing winds blow the gas back to the launch site.

It has been proposed to use ground-impact-type mechanical fuzes to detonate explosive primers which, in turn, burn the chemical main charge, thereby initiating a chemical reaction that produces the incapacitating gas. However, such ground-impact-type mechanical fuzes do not disperse the incapacitating gas as well as an above-ground release. Also, the existing ground-impact-type fuzes are expensive to produce , and are somewhat bulky. Ground-impact fuzes will misfire if they land on a soft target area, thereby subjecting friendly forces to armed, dud-fired, chemical munitions when the target area is re-taken. Furthermore, the mechanical type fuzes occupied a comparatively large volume within the projectile, thereby reducing the available remaining volume for the chemical payload.

SUMMARY OF THE INVENTION

1. Objects of the Invention

It is a general object of this invention to advance the state of the art of submunition fuzes, particularly submunition fuzes used for delivering an incapacitating gas to a restricted area.

It is another object of this invention to produce a reliable incapacitating gas delivery system which is safe to launch personnel.

A further object of this invention is to provide a fail-safe fuze for reliably igniting and burning a solid chemical charge at far range well away from the launch site.

Still another object of this invention is to provide a pyrotechnic submunition fuze which resists the environmental stresses generated during launch, and yet is inexpensive to produce.

Yet another object of this invention is to increase the size of the chemical payload to be ignited by such fuzes.

Another object of this invention is to provide a fuze operative for initiating the chemical reaction that produces the incapacitating gas while the submunition is still in the air, for better dispersion of the gas, and for providing a high degree of reliability on both soft and hard targets.

2. Features of the Invention

In keeping with these objects, and others which will become apparent hereinafter, one feature of this invention resides, briefly stated, in a fuze for a submunition of the type subjected to spinning and air turbulence after launch of a projectile containing the submunition. In a preferred embodiment, a multitude of such submunitions are stacked and loaded into a projectile containing the submunitions. The submunitions are ejected from the projectile upon detonation of an on-board expelling charge after launch.

A hollow core rod is centrally mounted within, and extends along a longitudinal axis of, the projectile. The rod has an interior longitudinal channel, and at least one flash port, and preferably a plurality of flash ports, each extending radially outwardly of the longitudinal axis and communicating with the longitudinal channel.

The submunitions surround the core rod. Each submunition has a submunition housing, preferably of wedge-shaped design, having a compartment containing a solid pyrotechnic chemical main charge. When burned, the main charge produces a gas capable of incapacitating humans and animals. The housing has at least one access port, and preferably a pair of access ports, each aligned with a respective flash port and communicating with the main charge in the compartment.

A pyrotechnic fuzing means is loaded into the longitudinal channel and each access port. For example, an ignition thin layer explosive in a string form can be inserted through the longitudinal channel, and an explosive pellet mixture can be inserted into each access port. The fuzing means burns upon detonation of the expelling charge. A flame is directed initially along the longitudinal channel, then into and through the flash ports, and then along the access ports to burn the main charge in the compartment. The resulting incapacitating gas is discharged through a discharge port provided on each housing. The gas saturates an area, access to which is to be denied, at a far range from the projectile launch site.

Another feature of this invention is embodied in an arming module operative for arming the projectile after launch. The module includes an elongated flash channel having one end facing the expelling charge and an opposite end facing the pyrotechnic fuzing means in the longitudinal channel. A blocking means, e.g. a blocking bar or plate, is mounted for movement between blocked and unblocked positions in which the blocking means is positioned in and out of the flash channel. A displacing means, i.e. a coil spring, is operative for constantly displacing the blocking means to the blocked position against centrifugal forces generated after launch until such centrifugal forces reach a predetermined threshold, e.g. 52 rpm of spin, sufficient to displace the blocking means to the unblocked position.

A delay fuzing means is advantageously provided in the flash channel, and is operative for burning after detonation of the expelling charge and for igniting the pyrotechnic fuzing means in the longitudinal channel after elapse of a time interval after such detonation.

The above-described fuze is normally unarmed since the blocking means is normally positioned in the blocked position. In order for the blocking means to be moved to the unblocked position, the projectile must, first of all, be launched and, secondly, imparted with a minimum spin sufficient to generate centrifugal forces strong enough to pull the blocking means against the restoring force of the spring.

At a certain elevation, the on-board expelling charge is detonated, thereby pushing all of the submunitions and the core rod out through the back end of the projectile. At this time, the submunitions and the cored rod are tightly packed together within a thin-walled cannister.

The detonation of the expelling charge generates hot gases which flow into the flash channel and ignite the delay fuzing means. After a predetermined time interval has elapsed, the fuzing means in the longitudinal channel of the core rod burns lengthwise of the core, thereby setting off an explosion which bursts the cannister, directs flames through each of the aligned flash and access ports, ignites the fuzing means in each access port, and disperses the submunitions apart from one another. Once the fuzing means in each access port ignites the main charge in each dispersed submunition, a chemical reaction takes place to generate the incapacitating gas which issues from the discharge port provided on each housing. All of these factors mitigate against the discharge of the incapacitating gas in the proximity of the launch site, thereby maximizing safety for launch personnel.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
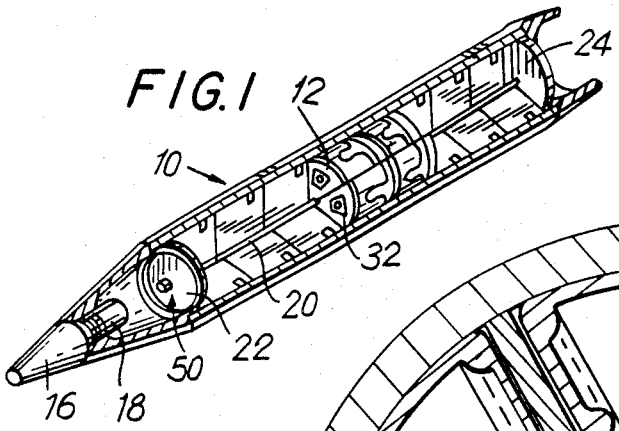
FIG. 1 is a cut-away perspective view of a projectile containing a plurality of submunitions, each ignited by a pyrotechnic fuze according to the present invention.
Figure 2:
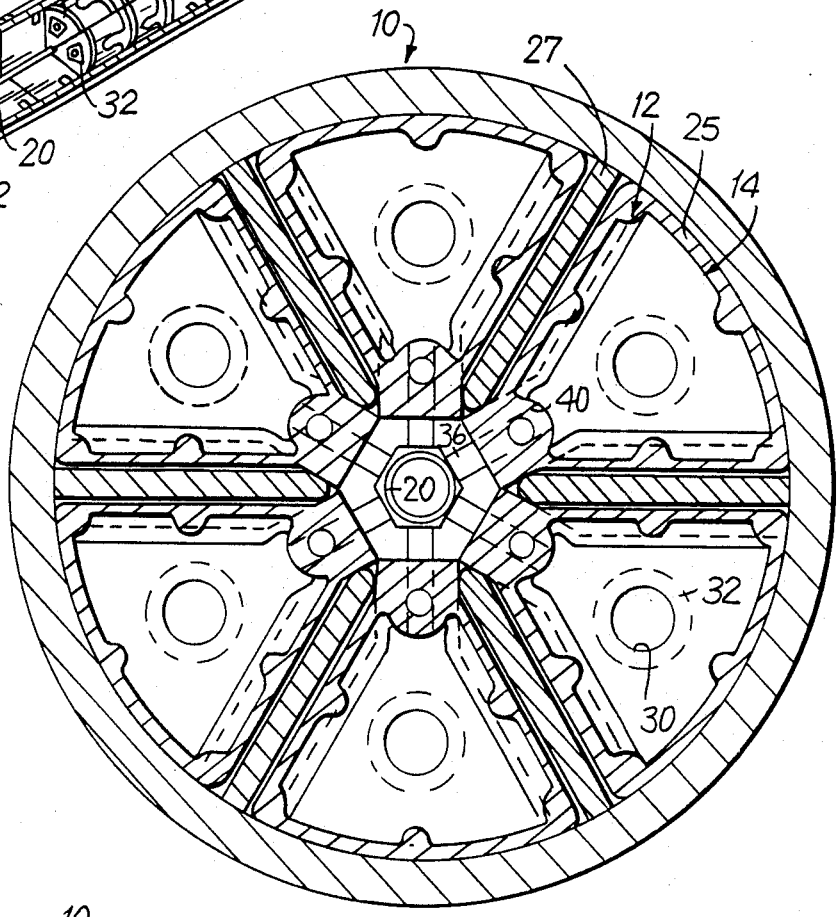
FIG. 2 is a cross-sectional view of the projectile.
Figure 3:
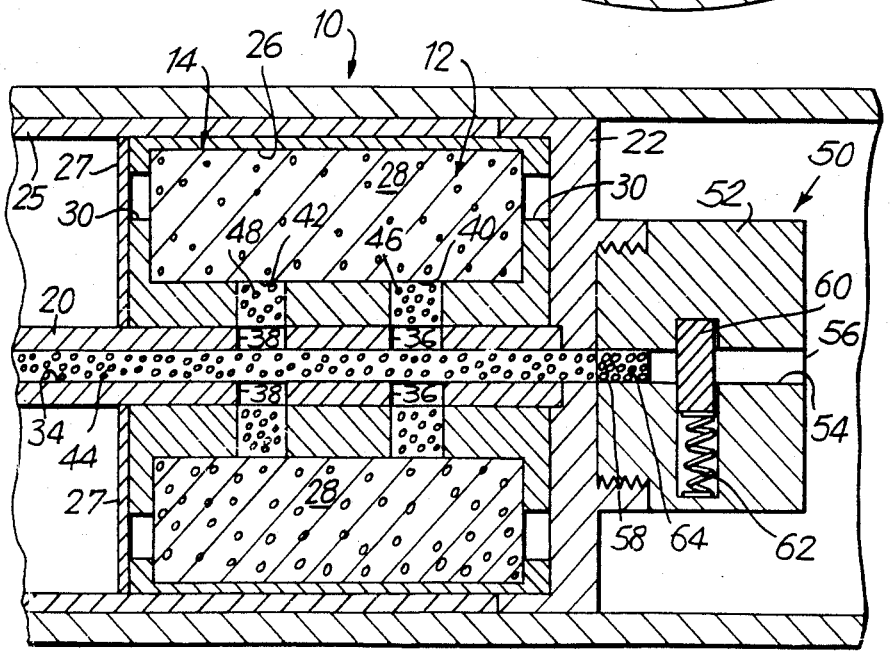
FIG. 3 is a broken-away sectional view of the front end of the projectile in an unarmed position.

Referring now to FIG. 1, reference numeral 10 generally identifies a streamlined launch projectile. In the preferred embodiment, the projectile 10 is dimensioned so as to be launched from a 155 mm gun or howitzer. A plurality of submunitions, a representative one of which is identified by reference numeral 12 in FIGS. 2 and 3, are loaded into the projectile. Each submunition 12 has a wedge-shaped housing 14 which subtends an angle of about 60° as seen in top plan view. As shown in FIG. 2, six of these submunitions are arranged in an annulus or ring-shaped tier resembling a circular pie cut into six equal sectors. As shown in FIG. 1, eight of these tiers are stacked, one immediately behind another, lengthwise of the projectile. Hence, the loaded projectile, in the preferred embodiment, has forty-eight identical submunitions 12 stacked in mutual close contact.

Returning to FIG. 1, an expelling fuze 16 is located at the nose of the projectile. An on-board expelling charge 18 is located rearwardly of the expelling fuze 16. A flight-stabilizing, hollow core rod 20 extends along a longitudinal axis through the center of the stacked tiers of submunitions. A front pusher plate 22 is mounted at a front end of the rod 20 above the stacked submunitions. A rear end plate 24 is mounted at a rear end of the rod 20 below the stacked submunitions. A thin-walled cannister 25 tightly surrounds the submunitions between the plates 22, 24. A plurality of support plates 27, each located between two adjacent submunitions, extends radially outwardly from the core rod to the cannister. The plates 22, 24, 27 and the cannister 25 with the stacked submunitions therein form a closely packed assembly which, together with the core rod 20, is inserted as a submunitions unit into the main body of the projectile. The end plate has shear pins which engage the outer casing of the projectile 10 in order to maintain the submunitions unit in place.

In a conventional manner, a load of gunpowder or the like is loaded into a gun barrel formed with interior rifling, after the projectile 10 was loaded into the barrel. The projectile is launched by the explosion of the gunpowder. The rifling imparts a spin to the projectile. At a predetermined elevation and time after launch, the expelling fuze 16 ignites the expelling charge 18, and the resulting detonation gases force the submunitions unit comprised of the pusher plate 22 and, in turn, all of the submunitions 12, the core rod 20, the support plates 27, the end plate 24 and the cannister 25 out through the back end of the projectile. The force of the explosion shears the aforementioned shear pins. The spin imparted to the projectile 10 causes the expelled submunitions unit to also spin.

Turning now to FIG. 3, each submunition housing 14 has a compartment 26 which contains a solid pyrotechnic chemical main charge 28. When burned, the main charge produces an incapacitating gas. Two discharge ports 30 are provided on the housing and communicate with the compartment 26. Each discharge port 30 is normally covered by a rupturable foil, preferably a tin foil 32 (see FIG. 1) to maintain the main charge within the compartment 26. During burning of the main charge, the foil 32 ruptures and permits discharge of the gas.

The core rod 20 has an interior longitudinal channel 34 and a plurality of flash ports, e.g. 36 and 38, extending radially outwardly of the longitudinal axis and communicating with the longitudinal channel 34. Each housing 14 has a pair of access ports 40, 42 aligned with the flash ports 36, 38 respectively, and communicating with the main charge in the compartment 26.

Pyrotechnic fuzing means are loaded within the longitudinal channel 34 and each access port 40, 42. The fuzing means advantageously comprises an ignition thin layer explosive 44 or other explosive material, preferably extruded as a string for easy insertion into and through the longitudinal channel 34. The fuzing means also advantageously comprises explosive pellets 46 or other explosive material inserted into each access port 40, 42. The explosive fuzes 44, 46, 48 burn upon detonation of the expelling charge 18.

As shown in FIG. 3, an arming module 50 is operative for arming the projectile 10 after launch. The module 50 includes an arming member 52 threaded into a threaded neck of the pusher plate 22. An elongated flash channel 54 within the arming member 52 has one end 56 facing the expelling charge 18 and an opposite end 58 facing the explosive fuze 44 in the longitudinal channel 34.

A blocking means 60, e.g. a blocking bar or plate, is mounted for movement between blocked and unblocked positions in which the blocking means is positioned in and out of the flash channel. A displacing means, i.e. a coil spring 62, is operative for constantly displacing the blocking means 60 to the illustrated blocked position against centrifugal forces generated by the spinning submunitions unit after launch until such centrifugal forces reach a predetermined threshold, e.g. 52 rpm of spin, sufficient to displace the blocking means 60 to the unblocked position against the restoring force of the spring 62.

A delay fuzing means 64, advantageously provided in the flash channel 54, is operative for burning after detonation of the expelling charge 18 and for igniting the explosive fuze 44 in the longitudinal channel 34 after elapse of a time interval after such detonation.

As previously mentioned, the fuze is normally unarmed since the blocking means 60 is normally held in the illustrated blocked position within the flash channel 54. Once the projectile is launched and imparted with a spin due to rifling within the gun barrel, add when the spin is at least 52 rpm, the resulting centrifugal forces are sufficient to displace the blocking means 60 against the action of the spring 62 to the unblocked position. The flash channel 54 is now open, and the fuze is armed.

Next, the expelling charge 18 detonates at a certain elevation and time by the expelling fuze. The detonation of the expelling charge causes the entire submunitions unit to be jettisoned out the rear of the projectile and also ignites the delay fuze 64. Once the delay fuze burns through, the explosive fuze 44 in the channel 54 is ignited, thereby setting off an explosion which bursts the cannister 25, directs flames through each of the aligned flash and access ports, ignites the explosive fuze 46 in each access port, and disperses the submunitions 12 apart from one another. The explosive force from the explosive fuze 44 is minimal. The explosive fuze produces more fire than overpressure. The combination of the small pressure generated by the explosive fuze 44, the centrifugal forces of all the submunitions pushing outwardly against the cannister wall, and the severe wind turbulence the cannister encounters after leaving the projectile body 10 all cause the cannister walls to split apart along scored sections. Once the explosive fuze 46 in each access port ignites the main charge 28 in each dispersed submunition 12, a chemical reaction takes place to generate the incapacitating gas that ruptures each foil 32 and issues from each discharge port 30 provided on each housing.

The area to which the projectile has been aired is thus saturated with the gas at a far range from the projectile launch site. Thus, the main charge of each submunition is reliably delivered to the restricted area and is only detonated at that restricted area. Each submunition can only deliver its payload once the projectile has been properly launched with a spin exceeding a predetermined threshold value, and only after the submunitions have been ignited by the projectile expelling charge, and only after the submunitions have been dispersed apart from one another.

The foregoing disclosure and drawings are merely illustrative of the principles of this invention and are not to be interpreted in a limiting sense. I wish it to be understood that I do not desire to be limited to the exact details of construction shown and described because obvious modifications will occur to a person skilled in the art.

It will be understood that each of the elements described above, or two or more together, also may find a useful application in other types of constructions differing from the types described above.

While the invention has been illustrated and described as embodied in a submunition fuze with pyrotechnic ignition, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A fuze for a submunition ejected from a launched projectile upon detonation of an on-board expelling charge, comprising:

(a) a hollow core rod centrally mounted within, and extending along a longitudinal axis of, the projectile, said core rod having an interior longitudinal channel, and at least one flash port extending radially outwardly of the longitudinal axis and communicating with the longitudinal channel;

(b) at least one submunition housing mounted within the projectile radially adjacent the core rod, said housing having a compartment containing a solid pyrotechnic chemical main charge which, when burned, produces an incapacitating gas, said housing having at least one access port aligned with a respective flash port and communicating with the main charge in the compartment;

(c) pyrotechnic fuzing means loaded within the longitudinal channel and a respective access port, and operative for burning upon detonation of the expelling charge, thereby directing a flame through the longitudinal channel, the respective flash port and the respective access port to burn the main charge in the compartment; and (d) a discharge port on the housing and through which the incapacitating gas is discharged, for saturating an area with the incapacitating gas.

2. The fuze as recited in claim 1, wherein said one housing is wedge-shaped, and wherein a plurality of identical wedge-shaped housings are arranged in an annulus to form a tier within the projectile, and wherein a plurality of identical tiers are stacked within the projectile.

3. The fuze as recited in claim 2, wherein six housings are arranged in each tier, and wherein eight tiers are stacked within the projectile.

4. The fuze as recited in claim 1, wherein a plurality of submunition housings are packed within the projectile, and wherein each housing has a pair of access ports; and wherein the core rod has a plurality of flash ports, each aligned with a respective access port of the housings.

5. The fuze as recited in claim 4; and further comprising a tubular cannister surrounding the housings and the core rod.

6. The fuze as recited in claim 1; and further comprising arming means for arming the projectile after launch, said arming means including an elongated flash channel having one end facing the expelling charge and an opposite end facing the pyrotechnic fuzing means in the longitudinal channel, a blocking means mounted for movement between blocked and unblocked positions in which the blocking means is positioned in and out of the flash channel, and displacing means for constantly displacing the blocking means to the blocked position against centrifugal forces generated after launch until such centrifugal forces reach a predetermined threshold sufficient to displace the blocking means to the unblocked position.

7. The fuze as recited in claim 6; and further comprising a delay fuzing means in the flash channel, and operative for burning after detonation of the expelling charge and for igniting the pyrotechnic fuzing means in the longitudinal channel after elapse of a time interval after such detonation.

8. The fuze as recited in claim 1, wherein the pyrotechnic fuzing means includes an ignition thin layer explosive.

9. The fuze as recited in claim 1, wherein the pyrotechnic fuzing means includes a mixture of explosive pellets.

* * * * *